March 6, 1928.
M. OSBORN
STOVEPIPE ATTACHMENT
Filed July 10, 1925
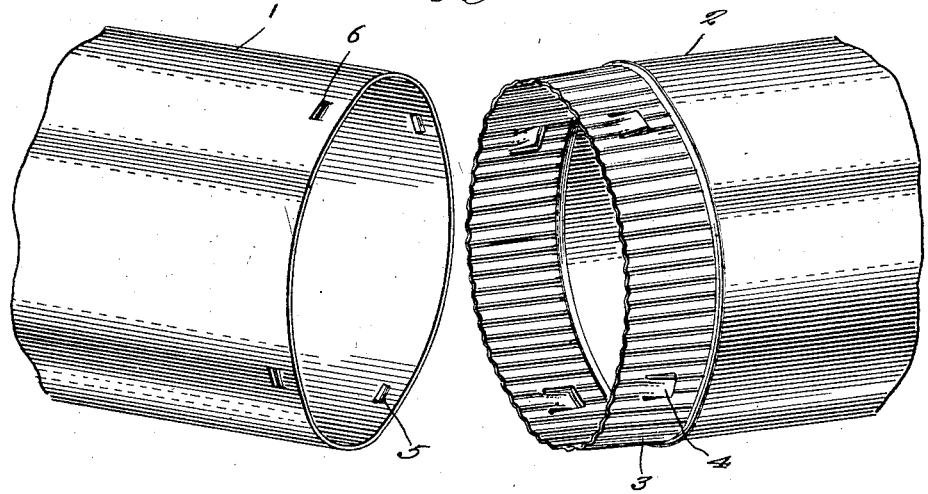
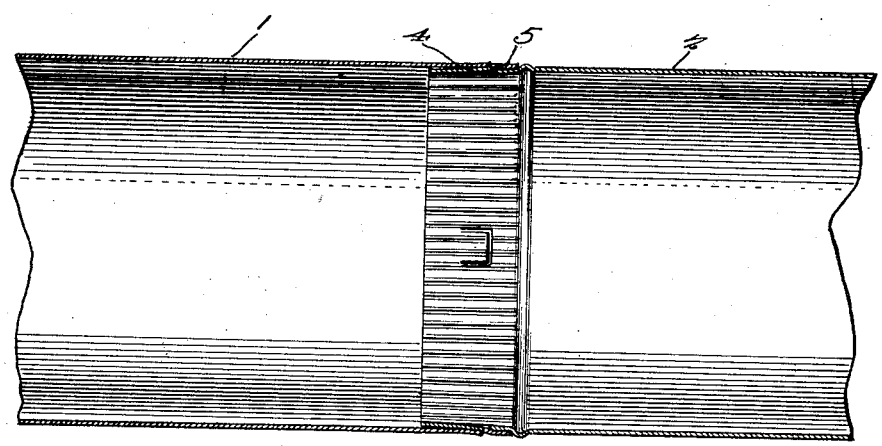
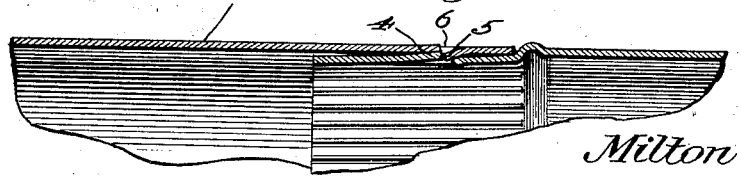
1,661,674
Milton Osborn
INVENTOR
BY Victor J. Evans
ATTORNEY Patented Mar. 6, 1928.

1,661,674

UNITED STATES PATENT OFFICE.

MILTON OSBORN, OF WAYNE CITY, ILLINOIS.

STOVEPIPE ATTACHMENT.

Application filed July 10, 1925. Serial No. 42,810.

This invention relates to stove pipes and more particularly to lock joints therefor.

The primary object of the invention is to provide a lock joint for securing telescopic ends of pipe sections together to provide a substantial rigid joint that necessitates rotation of the pipe sections before the joint can be disconnected.

Another object of invention is to provide a pipe joint of simple and inexpensive nature and one that is automatic in its connecting action, such action consisting in merely telescoping the ends of the sections and the locking means will snap in operative position.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a perspective view showing coacting ends of two respective pipe sections arranged in spaced relation to illustrate the structure of the novel joint.

Figure 2 is a vertical longitudinal sectional view taken through fragmentary portions of pipe sections showing pipes connected.

Figure 3 is an enlarged view to clearly illustrate locking means.

Referring to the drawings in detail the reference numerals 1 and 2 indicate fragmentary portions of pipe sections and illustrate the cooperating ends thereof, the pipe section 2 having its end crimped as at 3 and being adapted to be telescopically received in the pipe section 1 as clearly shown in Figures 2 and 3 of the drawings.

To insure a substantially rigid connection between the pipe sections there are provided tongues 4 formed in the crimp portion 3 of the pipe section 2 and such tongues are constructed by making U-shaped cuts in the crimp portion and are then arranged to have their free portions extend outwardly beyond the surface of the pipe section 2 as clearly shown in Figure 1 of the drawings and to provide a contacting engagement with projections 5 formed on the cooperating end of the pipe section 1 by cutting slots 6 therein, the projections 5 are much smaller than the tongues and are formed by cutting the slots as will be readily apparent upon inspection of Figure 3 of the drawings.

In order to associate the respective ends of the pipe sections as shown in Figure 1 of the drawings, it is necessary to telescope the end of the pipe section 2 into the pipe section 1 in the manner as shown in Figure 2, and from the natural inherent resiliency of the tongues 4 they will snap into engagement with the projections 5 and form a substantial rigid connection between the respective sections. When it is desired to disconnect the ends of the pipe sections as shown, the end as shown in the pipe section 2 must be rotated in order to arrange the tongues 4 out of engagement with projection 5 and when this action takes place the sections may be readily separated as will be readily apparent.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A pipe joint for substantially rigidly securing the ends of pipes together in telescopic formation, tongues and projections produced on said pipes by making U-shaped cuts adjacent the end of each pipe with the tongues at one end and the projections in the opposite end, said tongues and projections being bent in a manner whereby they extend away from the end of the pipe in which they are formed, said tongues being on the inner pipe and bent outwardly while the projections are on the outer pipe and bent inwardly, and said pipes being mounted to position the tongues with their free ends in end to end abutment with the free ends of the projections.

In testimony whereof I affix my signature.

MILTON OSBORN.